(12) United States Patent
Walker et al.

(10) Patent No.: US 9,895,639 B2
(45) Date of Patent: Feb. 20, 2018

(54) FILTER ASSEMBLY AND FILTER ELEMENT FOR USE IN THE ASSEMBLY

(71) Applicant: Walker Filtration Ltd, Washington, Tyne & Wear (GB)

(72) Inventors: Brian Walker, Washington (GB); Chris Nixon, Washington (GB); Simon Wise, Washington (GB); Peter Carney, Washington (GB)

(73) Assignee: WALKER FILTRATION LTD, Washington, Tyne & Wear (GB)

( * ) Notice: Subject to any disclaimer, the term of this patent is extended or adjusted under 35 U.S.C. 154(b) by 0 days.

(21) Appl. No.: 14/476,162

(22) Filed: Sep. 3, 2014

(65) Prior Publication Data
US 2015/0128546 A1 May 14, 2015

(30) Foreign Application Priority Data

Sep. 3, 2013 (GB) .................................. 1315625.2
Apr. 28, 2014 (GB) .................................. 1407442.1

(51) Int. Cl.
*B01D 46/00* (2006.01)
*B01D 46/24* (2006.01)

(52) U.S. Cl.
CPC ..... *B01D 46/0005* (2013.01); *B01D 46/0004* (2013.01); *B01D 46/0041* (2013.01); *B01D 46/2414* (2013.01)

(58) Field of Classification Search
CPC ............ B01D 46/0004; B01D 46/0005; B01D 46/2411; B01D 46/2414; B01D 2265/025
See application file for complete search history.

(56) References Cited

U.S. PATENT DOCUMENTS

| | | | | |
|---|---|---|---|---|
| 6,409,786 B1 * | 6/2002 | Wright | ............... | B01D 46/0004 55/317 |
| 2003/0102257 A1 | 6/2003 | Reid | | |
| 2006/0162305 A1 | 7/2006 | Reid | | |

FOREIGN PATENT DOCUMENTS

| GB | 2222536 A | 3/1990 |
|---|---|---|
| WO | 99/30798 A1 | 6/1999 |
| WO | 99/30799 A1 | 6/1999 |
| WO | 99/30800 A1 | 6/1999 |

* cited by examiner

*Primary Examiner* — Robert Clemente
(74) *Attorney, Agent, or Firm* — Egbert Law Offices, PLLC

(57) ABSTRACT

A filter assembly for collecting material entrained in a fluid stream includes a filter element having a tubular filter and an end cap providing a flow conduit which extends between first and second conduit openings communicating with the internal void of the tubular filter. A housing for the filter element has inlet and outlet ports for the fluid stream, a housing bowl in which the tubular filter is located, and a housing head which provides at least one of the ports as a docking port for the first conduit opening. The housing head and end cap are arranged such that the end cap is inserted into the housing head, and then rotated relative to the housing head about an axis perpendicular to the axis of the tubular filter and to the axis of the first conduit.

14 Claims, 5 Drawing Sheets

FILTER ASSEMBLY AND FILTER ELEMENT FOR USE IN THE ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a filter assembly for collecting material that is entrained in a fluid stream, and to a filter element for use in the assembly.

2. Description of Related Art Including Information Disclosed Under 37 CFR 1.97 and 37 CFR 1.98

A conventional filter assembly, e.g. for removing liquid droplets from compressed air, has a housing which contains a consumable filter element located in the flow path of a fluid to be filtered so that the fluid flows through the element.

A typical filter assembly includes a housing manifold which is detachably joined to a housing bowl, the filter element having a first end cap which engages with the manifold. The filter element is usually tubular in shape and can be removably inserted into the manifold when the bowl is detached from the manifold. The bottom of the filter element typically terminates in a second end cap.

Fluid to be filtered is directed from an inlet port in the manifold via an opening in the first end cap to the central region of the filter element, the fluid then flowing through the filter material of the filter element and exiting the assembly through an outlet port, typically in the manifold.

The first end cap typically has a formation which sealingly engages with a corresponding formation on the manifold to prevent leakage of fluid en route from the inlet port to the central region of the filter element. As illustrated for example in GB 2222536A, the top end cap can have a spigot in which the opening in the end cap is formed, the spigot inserting into a receiving port of the manifold and the seal being effected by O-rings.

WO 1999/030798 proposes a different arrangement, in which a filter assembly includes a housing for a tubular filter element, the housing having a manifold providing inlet and outlet ports for the gas that is to be filtered. Instead of a simple spigot, the filter element has at one end a flow conduit which has a first conduit opening communicating with one of the ports and a second conduit communicating with the central region of the filter element, the flow conduit curving through about 90° between the first and second conduit openings. To form a seal between the first conduit opening and the respective manifold port, the flow conduit has to be slid transversely relative to the direction of flow of fluid through the port. Wedge formations force mating surfaces of the first conduit opening and the manifold port together during the transverse sliding to enhance the seal.

BRIEF SUMMARY OF THE INVENTION

Although filter assemblies having flow conduits of the type shown in WO 1999/030798 may in some circumstances provide useful alternatives to assemblies having more conventional spigot-type arrangements, a problem arises in that the transverse sliding motion which forms the seal between the first conduit opening and the respective port can damage a sealing element (typically an O-ring or other gasket) located at the interface between the opening and the port. In particular, the sealing element, in the process of being compressed by the wedge formations, typically has to slide over a sharp edge of one of the mating surfaces, which produces a shearing or tearing action on the sealing element, and results in a damaged or faulty seal.

Accordingly, in a first aspect the present invention provides a filter assembly for collecting material that is entrained in a fluid stream, the assembly including:

a removable filter element having a tubular filter through which, in use, the fluid stream flows, and an end cap providing a flow conduit which extends between a first conduit opening and a second conduit opening communicating with the internal void of the tubular filter, the axis of the first conduit opening being at an angle to the axis of the tubular filter; and a housing for the filter element, the housing having inlet and outlet ports for the fluid stream, a housing bowl in which the tubular filter is located, and a housing head which provides at least one of the ports as a docking port for the first conduit opening;

wherein the housing head and the end cap are arranged such that the end cap is inserted into the housing head, and then rotated relative to the housing head about an axis perpendicular to the axis of the tubular filter and to the axis of the first conduit opening to bring the first conduit opening and the docking port into sealed communication.

Advantageously, by forming the seal between the first conduit opening of the filter element end cap and the docking port by a rotation about such an axis, the risk of causing damage to a sealing element (e.g. O-ring or other gasket) at the interface between the first conduit opening and the port by a transverse sliding motion can be avoided. In particular, the opening and the port can be spaced apart but in facing relationship to each other at the commencement of the rotation, which then reduces the spacing between the opening and the port while maintaining the facing relationship until the opening and the port come into sealing engagement.

The filter assembly of the first aspect may have any one or, to the extent that they are compatible, any combination of the following optional features.

The housing head may have a stop formation which contacts a corresponding portion of the end cap when, on insertion, the first conduit opening arrives at a position facing the docking port, the stop formation preventing further insertion of the end cap into the housing head. In this way, appropriate alignment of the first conduit opening and the docking port can be ensured (e.g. so that they are in facing relationship to each other) before the rotation commences. The stop formation and the corresponding portion of the end cap may be arranged to enter into positive locking (e.g. resilient snap-fit) engagement when they contact, allowing the user to more easily determine that the first conduit opening has arrived at a position facing the docking port. Conveniently, the end cap may pivot on the stop formation during the rotation which brings the first conduit opening and the docking port into sealed communication. Thus the stop formation can provide a stable fulcrum for the rotation. Preferably, the stop formation is coplanar with the mating surface of the docking port, and similarly the position on the end cap contacted by the stop formation is coplanar with the corresponding mating surface of the first conduit opening. Such an arrangement can help to ensure that the alignment of the port and the opening is maintained during the rotation.

The housing head and the end cap may be arranged such that, during insertion of the end cap into the housing head, the end cap is required to be presented to the housing head at a tilt angle which is removed by the subsequent rotation which brings the first conduit opening and the docking port into sealed communication. By enforcing such a tilt angle, the risk of causing damage to a sealing element at the interface between the opening and the port can be further reduced as a mating surface of the first conduit opening can be kept away from a corresponding mating surface of the docking port during the insertion. For example, one of the housing head and the end cap may have a projecting portion which slidingly engages a surface of the other of the housing head and the end cap during insertion of the end cap into the housing head to enforce the tilt angle, the projecting portion being received in a recess formed in the other of the housing head and the end cap on the rotation. Not only can the projecting portion enforce the tilt angle, but advantageously, when received in the recess, it can act as a stop to prevent accidental withdrawal of the filter element. Conveniently the end cap has the projecting portion and the recess is the docking port.

The housing head and the end cap may have a guide arrangement which guides the end cap during the insertion thereof so as to bring the first conduit opening to a position facing the docking port in readiness for the rotation which brings the first conduit opening and the docking port into sealed communication. For example, the end cap may have a guide bar adjacent the leading edge (relative to the insertion motion) of the first conduit opening, the ends of the guide bar travelling in respective grooves provided by the housing head at opposing lateral sides of the docking port during the insertion of the end cap.

The housing head and the end cap may have a camming arrangement operable to apply a force urging the rotation which brings the first conduit opening and the docking port into sealed communication. For example, the end cap may provide a cam device (e.g. a rotating cam device) which acts on a surface of the housing head to apply the force. Not only does operation of the camming arrangement urge the rotation, but advantageously it can maintain a positive sealing force across the interface between the first conduit opening and the docking port when they are in sealed communication. Indeed, the camming arrangement may be operable to apply a secondary force which over-pressures an interface between the first conduit opening and the docking port when they are in sealed communication, and then, with continued operation of the camming arrangement, to release the secondary force such that the over-pressure is relaxed but the first conduit opening and the docking port remain in sealed communication. In this way, the camming arrangement can have a bi-stable action, helping to prevent accidental release of the seal between the opening and the port.

The housing head may be formed from an extruded body section having an extrusion direction which is parallel with the axis of the housing bowl, an opening being machined in the extruded body section to form the docking port. A further opening may be machined in the extruded body section to form the other of the inlet and outlet ports. Conveniently, the extruded body section can be formed of aluminium alloy, magnesium alloy, titanium alloy, steel or plastic.

A second aspect the present invention provides the removable filter element of the filter assembly of the first aspect. Any one or, to the extent that they are compatible, any combination of the optional features of the filter assembly of the first aspect pertain also to the filter element of the second aspect.

In an example of the second aspect, a filter element for collecting material that is entrained in a fluid stream has a tubular filter through which, in use, the fluid stream flows, and an end cap providing a flow conduit which extends between a first conduit opening and a second conduit opening communicating with the internal void of the tubular filter, the axis of the first conduit opening being at an angle to the axis of the tubular filter;

the filter element being arranged for use with a housing for the filter element, the housing having inlet and outlet ports for the fluid stream, a housing bowl in which the tubular filter is located, and a housing head which provides at least one of the ports as a docking port for the first conduit opening, in use the end cap being inserted into the housing, and then rotated relative to the housing head about an axis perpendicular to the axis of the tubular filter and to the axis of the first conduit opening to bring the first conduit opening and the docking port into sealed communication;

wherein the end cap has a projecting portion which slidingly engages a surface of the housing head during insertion of the end cap into the housing head to enforce a tilt angle at which the end cap is required to be presented to the housing head, the projecting portion being received in a recess (which can conveniently be the docking port) formed in the housing head to remove the tilt angle on the rotation which brings the first conduit opening and the docking port into sealed communication.

The end cap may have a cam device which acts on a surface of the housing head and is operable to apply a force urging the rotation which brings the first conduit opening and the docking port into sealed communication.

Indeed, in another example of the second aspect, a filter element for collecting material that is entrained in a fluid stream has a tubular filter through which, in use, the fluid stream flows, and an end cap providing a flow conduit which extends between a first conduit opening and a second conduit opening communicating with the internal void of the tubular filter, the axis of the first conduit opening being at an angle to the axis of the tubular filter;

the filter element being arranged for use with a housing for the filter element, the housing having inlet and outlet ports for the fluid stream, a housing bowl in which the tubular filter is located, and a housing head which provides at least one of the ports as a docking port for the first conduit opening, in use the end cap being inserted into the housing, and then rotated relative to the housing head about an axis perpendicular to the axis of the tubular filter and to the axis of the first conduit opening to bring the first conduit opening and the docking port into sealed communication;

wherein the end cap has a cam device which acts on a surface of the housing head and is operable to apply a force urging the rotation which brings the first conduit opening and the docking port into sealed communication.

In either example, the cam device may be operable, on completion of the rotation, to apply a secondary force which over-pressures an interface between the first conduit opening and the docking port when they are in sealed communication, and then with continued operation of the cam device to release the secondary force such that the over-pressure is relaxed but the first conduit opening and the docking port remain in sealed communication.

Further optional features of the invention will now be set out. These are applicable singly or in any combination with any aspect of the invention.

The axis of the first conduit opening and the axis of the tubular filter may be at an angle of at least about 30°. Preferably the axes may be substantially perpendicular to each other.

The flow conduit may present, according to one option, a continuous smooth flow path to fluid flowing along it between the first conduit opening and the second conduit opening. According to a second option, however, the flow conduit may be formed as a plurality of successive straight sections which present a non-continuously smooth flow path to fluid flowing along it between the first conduit opening and the second conduit opening. For example, in the case of the axes of the first conduit opening and the tubular filter being substantially perpendicular to each other, the flow conduit may be formed as two successive straight sections (producing a simple 90° dog-leg), three successive straight sections (e.g. with the axis of each section being orientated at 45° relative to the axis of the preceding section) or four successive straight sections (e.g. with the axis of each section being orientated at 30° relative to the axis of the preceding section). Although there may be additional pressure losses associated with the flow path of the second option relative to that of the first option, such a performance disadvantage may be outweighed by an increased ease of manufacture of the flow conduit of the second option.

The end cap may have one or more positive locking (e.g. resilient snap-fit) connectors which form connections to one or more corresponding formations of the housing head on completion of the rotation.

The housing head may provide both the ports.

The fluid stream may be a gas stream.

BRIEF DESCRIPTION OF THE SEVERAL VIEWS OF THE DRAWINGS

Embodiments of the invention will now be described by way of example with reference to the accompanying drawings in which.

DETAILED DESCRIPTION OF THE INVENTION

Figure 1:
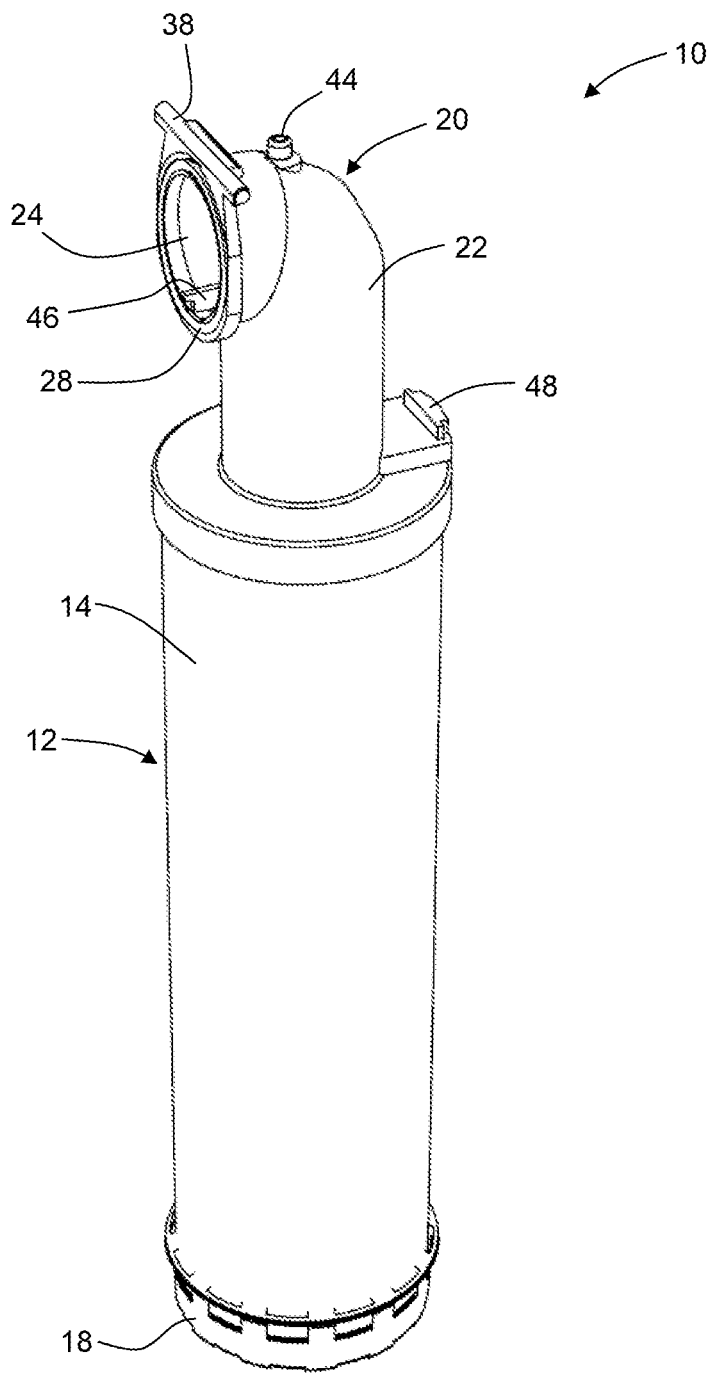
FIG. 1 shows a perspective view of a filter element.
Figure 2:
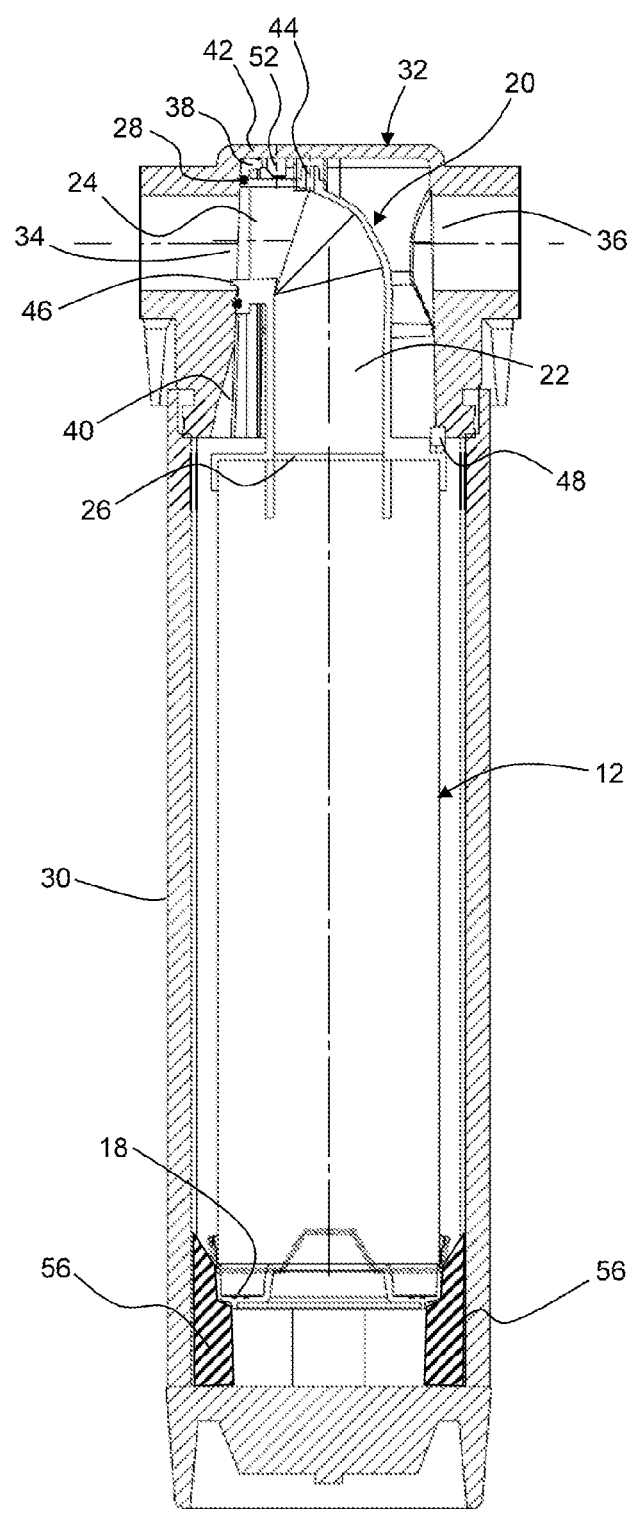
FIG. 2 shows a longitudinal sectional view of a filter assembly in which the filter element of FIG. 1 is housed in a housing.
Figure 3:
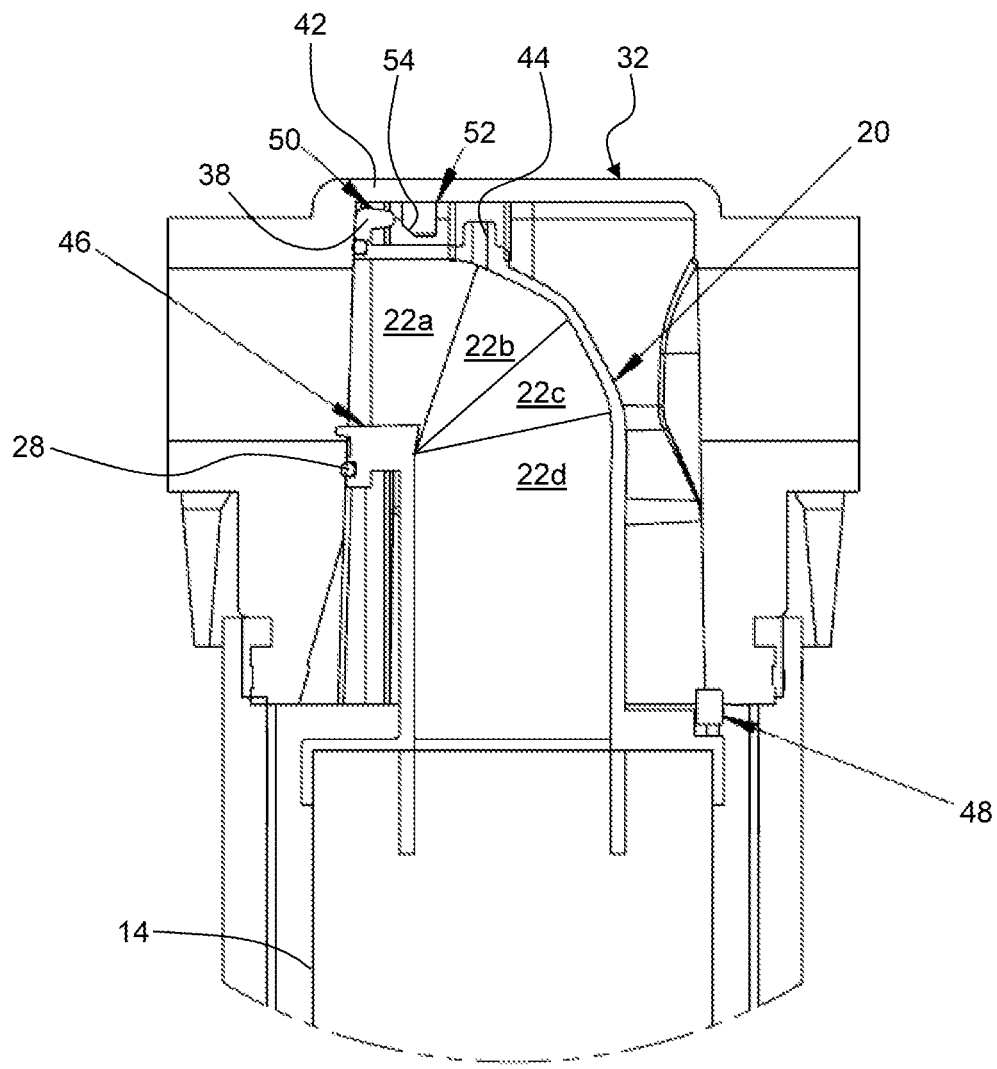
FIG. 3 shows a close-up view of a housing head of the housing and of a top end cap of the filter assembly of FIG. 2.
Figure 4:
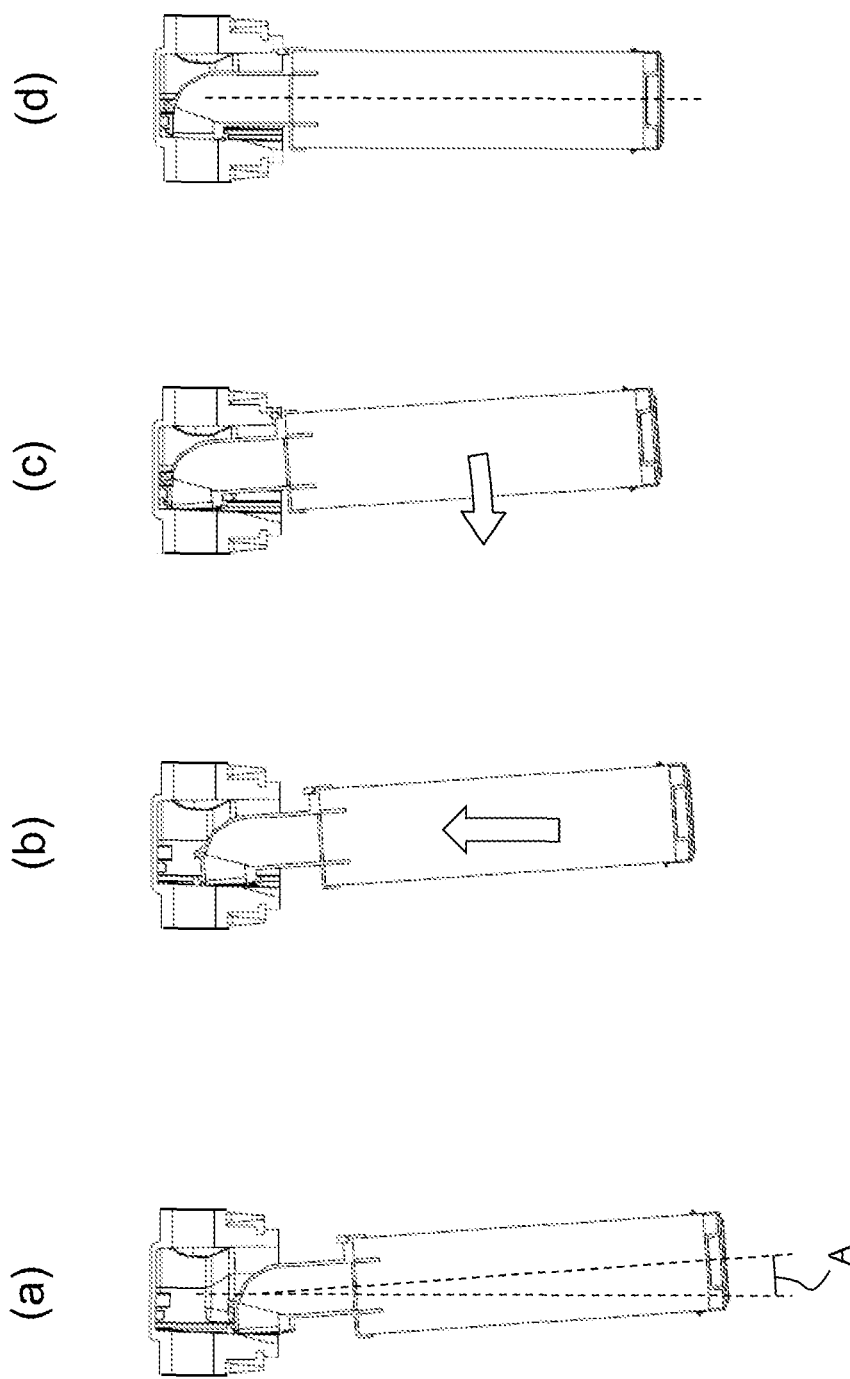
FIG. 4(a) to (d) are longitudinal sectional views showing stages in the fitting of the top end cap of the filter element of FIG. 1 to the housing head of the housing of FIG. 2.

FIG. 1 shows a perspective view of a filter element, FIG. 2 shows a longitudinal sectional view of a filter assembly in which the filter element of FIG. 1 is housed in a housing, and FIG. 3 shows a close-up view of a housing head of the housing and of a top end cap of the filter assembly of FIG. 2.

The filter element 10 has a tubular filter 12 formed by a tubular wall 14 of filter material terminated at top and bottom ends by respective end caps 20, 18. The top end cap 20 provides a flow conduit 22 extending between a first conduit opening 24 and a second conduit opening 26 communicating with the interior of the tubular filter. The axis of the first conduit opening is perpendicular to the axis of the tubular filter, such that the flow conduit turns through 90° between the two conduit openings. As best shown in FIG. 3, the flow conduit is formed from four successive straight sections 22a-d, the axis of each section being orientated at about 30° relative to the axis of the preceding section. An O-ring seal 28 surrounds the first conduit opening.

In the filter assembly, the filter element 10 is housed in a housing having a housing bowl 30 in which the tubular filter 12 is located and a housing head 32 in which the top end cap 20 is located. The housing bowl is screwed or otherwise fitted to the housing head to form an air-tight connection between the bowl and head but allowing the bowl to be removed from the head for access to the element. The base of the housing bowl may be provided with a plurality of circumferentially distributed flanges 56 which contact the bottom end cap 18 to centralise and the tubular filter 12 in the bowl and retain the top end cap in the housing head. The flanges can also prevent undesirable vibration of the element in service and transport. The housing head is in the form of a manifold and has a fluid inlet port 34 and a fluid outlet port 36. The first conduit opening 24 is docked in sealing communication with the fluid inlet port, with the O-ring seal being at the interface between the port and the opening.

In use, fluid to be filtered, such as compressed air, travels in flow series through the fluid inlet port 34, the first conduit opening 24, the flow conduit 22, and the second conduit opening 26 and then passes downwards into the centre of the tubular filter 12. The fluid passes through the tubular filter wall 14, which removes e.g. liquid droplets from the air, and enters the cavity between the filter wall and the housing bowl 30. From here the filtered fluid passes upwards out of the bowl, into the cavity between the housing head 32 and the top end cap 20, and finally exits through the outlet port 36. It is also possible for fluid to be flowed in reverse manner through the assembly, the roles of the inlet and outlet ports then being switched.

The process of fitting the top end cap 20 to the housing head 32 makes use of a guide bar 38 which extends across the top of the first conduit opening 24, an internal guide surface 40 of the housing head which extends around and below the inlet port 34, a stop formation 42 of the housing head located above the inlet port, and a differential pressure passage 44 which projects from the top of the flow conduit 22. FIGS. 4(a) to (d) are longitudinal sectional views showing stages in the fitting of the top end cap to the housing head.

As shown in FIG. 4(a), the top end cap 20 is presented to the housing head 32 at a tilt angle A and with the guide bar 38 of the top end cap contacting the guide surface 40 of the housing head. As shown in FIG. 4(b), the top end cap is then inserted into the housing head in an upwards direction (block arrow) while maintaining the tilt angle and keeping the guide bar in contact with the guide surface. A pair of optional flanges (not shown) projecting from the top end cap at respective sides of the guide surface may form grooves in which the ends of the guide bar can travel to prevent the guide bar from losing contact with the guide surface.

Eventually further insertion is prevented by the arrival of the guide bar 38 at the stop formation 42 of the housing head 32. As best shown in FIG. 3, a rib 52 in the housing head can help to locate the guide bar at the stop formation. The rib can have an angled face 54, providing a lead-in for the arrival of the guide bar at the stop formation. The stopped insertion location of the top end cap 20 corresponds with the first conduit opening 24 arriving at a position facing the inlet port 34. However, the tilt angle A creates a spacing between the first conduit opening and inlet port such that the opening and the port do not slide over each during the insertion, thereby helping to prevent damage to the O-ring seal 28.

In addition, the differential pressure passage 44 sealingly engages a corresponding socket formed in the housing head 32 to further assist the correct location of the first conduit opening 24 relative to the inlet port 34.

The guide bar 38 and the stop formation 42 may be configured to provide a positive locking engagement (not shown) which can give the user tactile confirmation that the first conduit opening 24 arriving and the inlet port 34 are appropriately aligned.

Next, as shown in FIG. 4(c), the top end cap 20 is rotated (block arrow) relative to the housing head 32 about an axis which is perpendicular to the axis of the tubular filter 12 and to the axis of the first conduit opening 24 to bring the first conduit opening and the inlet port 34 into sealed communication, and more particularly to sealingly engage the O-ring 28 to a mating portion of the surface 40 surrounding the inlet port so that the opening and the port are fully docked. The rotation eliminates the tilt angle A, as shown in FIG. 4(d). In general, a tilt angle A of about 5° is large enough to prevent contact between the surface of the O-ring and the surface 40 during insertion of the top end cap, but small enough to allow the differential pressure passage 44 to maintain sealing engagement with its socket.

Conveniently, the stop formation 42 of the housing head 32 provides a stable fulcrum for the rotation. Also, as best shown in FIG. 3, the top surface 50 of the guide bar 38 is rounded to promote smooth rotation at the fulcrum. Further, as the stop formation is coplanar with the mating surface of the inlet port 34 and the guide bar 38 is coplanar with the mating surface of the first conduit opening 24, the first conduit opening and the inlet port remain in correct alignment and do not slide relative to each other during the rotation.

To ensure that the tilt angle A is maintained during the insertion of the top end cap 20 into the housing head 32, the top end cap has a projecting portion 46 (best shown in FIG. 3) in the form of a rib which projects from the interior of the first conduit opening 24 at the bottom side thereof. The projecting portion slidingly engages against the guide surface 40 during the insertion, preventing the O-ring seal 28 from contacting, and thus being damaged by, the guide surface. However, as the insertion completes and the first conduit opening and the inlet port 34 enter into alignment for the subsequent rotation, the projecting portion slides over the edge of the guide surface at the bottom of the inlet port. The rotation of the top end cap then causes the projecting portion to be received into the inlet port, as shown in FIG. 2. Advantageously, the close proximity of the projecting portion to the side of the inlet port allows the projecting portion to act as a stop against accidental withdrawal of the filter element 10.

The top end cap 20 has a rotatable cam device 48 located at the base of the flow conduit 22 on the opposite side thereof to the first conduit opening 24. After the insertion of the top end cap into the housing head 32 at the tilt angle A, the cam surface of the cam device engages an inside wall of the housing head. Operation of the cam device then applies a force urging the rotation which brings the first conduit opening and the inlet port 34 into sealed communication. Advantageously, the cam device can thus maintain a positive sealing force across the O-ring seal 28. Indeed the cam device may have a cam surface which allows it to be further operated to apply a secondary force which over-pressures the O-ring seal, and then, with continued operation, releases the secondary force such that the over-pressure is relaxed but the first conduit opening and the inlet port remain in sealed communication. Such a bi-stable cam device, which can be in the form of an over-lever cam, can help to prevent accidental release of the seal.

Figure 5:
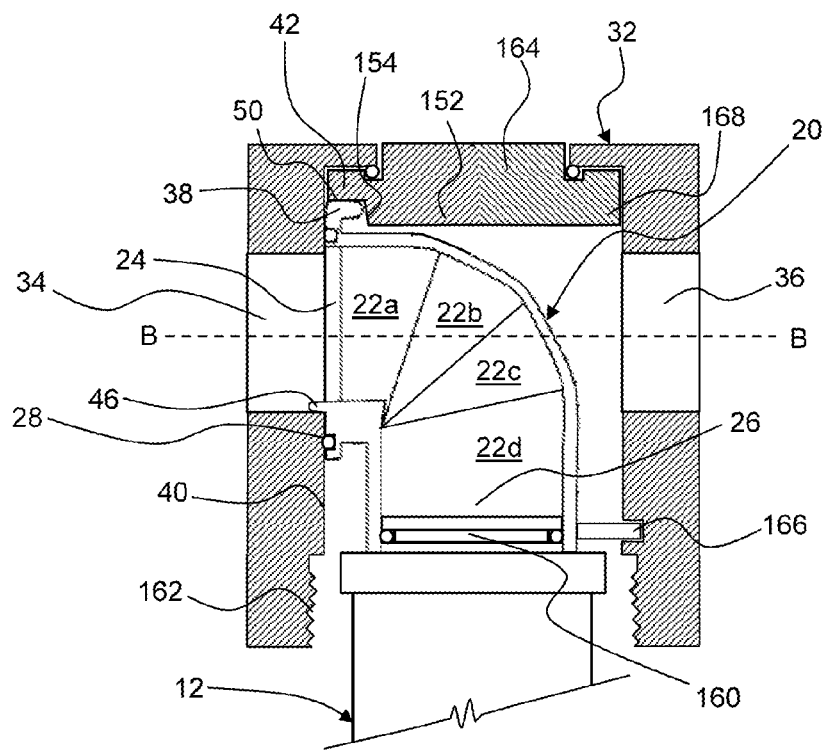
FIG. 5 shows a shows a close-up, longitudinal sectional view of a variant of the housing head and of a variant of a top end cap.
Figure 6:
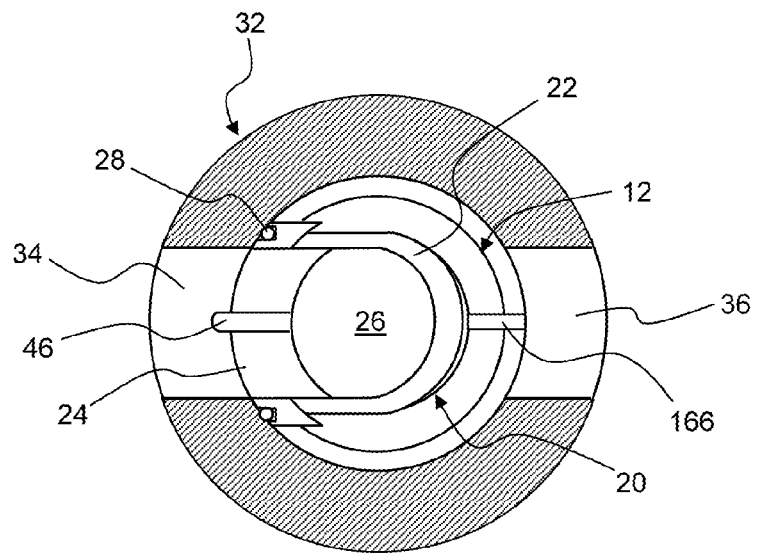
FIG. 6 shows a view onto the plane B-B of FIG. 5.

FIG. 5 shows a shows a close-up, longitudinal sectional view of a variant of the housing head 32 and of a variant of a top end cap 20, and FIG. 6 shows a view onto the plane B-B of FIG. 5. In FIGS. 5 and 6 features which are identical or similar to features in FIGS. 1 to 4 have the same reference numbers as are used in FIGS. 1 to 4.

Again, the process of fitting the top end cap 20 to the housing head 32 makes use of a guide bar 38 which extends across the top of the first conduit opening 24, an internal guide surface 40 of the housing head which extends around port 34, a stop formation 42 of the housing head located above the port 34, and a projecting portion 46. Although not shown in FIGS. 5 and 6, a differential pressure passage which projects from the top of the flow conduit 22 may also be provided and used in the fitting process, which follows a procedure similar to that shown in FIGS. 4(a) to (d), i.e. presentation of the top end cap to the housing head at a tilt angle, insertion, and then rotation about an axis which is perpendicular to the axis of the tubular filter 12 and to the axis of the first conduit opening 24 to bring the first conduit opening and the port 34 into sealed communication.

In the variant of FIGS. 5 and 6, the tubular filter 12 is a push fit into the top end cap 20, a male end portion 160 of the tubular filter having an O-ring seal that seals the tubular filter to the inner surface of the second conduit opening 26.

Although not shown in FIGS. 5 and 6, the variant top end cap 20 may have a camming arrangement operable to apply a force urging the rotation which brings the first conduit opening 24 and the port 34 into sealed communication. Additionally or alternatively, a snap-fit arrangement 166 may be provided to retain the top end cap in the housing head.

The housing bowl (not shown in FIGS. 5 and 6) screws to the housing head 32 at a thread formation 162 to form an air-tight connection between the bowl and head.

In FIGS. 1 to 4, the housing head 32 can conveniently be formed as a casting or moulding. Although this option is available for forming the housing head of FIGS. 5 and 6, advantageously, the head is configured to allow it to be formed from an extruded body section having an extrusion direction which is parallel with the axis of the housing bowl (when the bowl is connected to the head). For example, the housing head can be formed from an extruded aluminium alloy tube, which is cut to the appropriate length, and then machined to form an internal cavity of the desired diameter, the inlet and outlet ports 34, 36, and the thread formation 162. The inlet and outlet ports may be machined with internal threads (not shown in FIGS. 5 and 6) for facilitating connection to other components. Other options for the material of the extruded body are magnesium alloy, titanium alloy, steel and plastic. By avoiding the need to produce casting moulds, the cost of production of the housing head can be significantly reduced. Also dimensions of the head can be easily modified, if needed, by selecting an extrusion of different diameter or wall thickness. In addition, as extruded bodies are not susceptible to casting defects, part rejection rates can be reduced and the pressure tightness of the head improved.

The housing head 32 is provided with a plug 164 which sealingly closes the end of the extruded body opposite from the thread formation 162. Conveniently, the plug can provide the stop formation 42 located above the port 34, the stop formation preventing further insertion of the top end cap 20 by contact with the guide bar 38. The plug may also have a projecting portion 152 which projects into the housing head cavity to form an angled face 154 which provides a lead-in for the arrival of the guide bar at the stop formation. To appropriately align the angled face within the housing head, the plug may have a location formation 168 which interacts with a corresponding formation provided in the side wall of the housing head, thereby ensuring that the plug can only be fitted in one angular position.

As best shown in FIG. 6, the cavity of the housing head 32 has a circular cross-section, and accordingly, the end face of the first conduit opening 24 is correspondingly curved to match the internal surface of the housing head. The guide bar 38 can be shaped to accommodate the internal curvature and allow unrestricted pivoting of the bar on the stop formation 42.

While the invention has been described in conjunction with the exemplary embodiments described above, many equivalent modifications and variations will be apparent to those skilled in the art when given this disclosure. For example, the top end cap may have one or more resilient snap-fit connectors which form connections to one or more corresponding formations of the housing head on completion of the rotation. Accordingly, the exemplary embodiments of the invention set forth above are considered to be illustrative and not limiting. Various changes to the described embodiments may be made without departing from the spirit and scope of the invention.

All references referred to above are hereby incorporated by reference.

We claim:

1. A filter assembly for collecting material that is entrained in a fluid stream, the filter assembly comprising:
   a removable filter element having a tubular filter through which, in use, the fluid stream flows, and an end cap providing a flow conduit which extends between a first conduit opening and a second conduit opening communicating with an internal void of the tubular filter, an axis of the first conduit opening being at an angle to an axis of the tubular filter; and
   a housing for the filter element, the housing having inlet and outlet ports for the fluid stream, a housing bowl in which the tubular filter is located, and a housing head which provides at least one of the ports as a docking port for the first conduit opening;
   wherein the housing head and the end cap are arranged such that the end cap is inserted into the housing head and then rotated relative to the housing head about an axis perpendicular to an axis of the tubular filter and to the axis of the first conduit opening to bring the first conduit opening and the docking port into sealed communication.

2. The filter assembly of claim 1, wherein the housing head has a stop formation which contacts a corresponding portion of the end cap when, on insertion, the first conduit opening arrives at a position facing the docking port, the stop formation preventing further insertion of the end cap into the housing head.

3. The filter assembly of claim 2, wherein the end cap pivots on the stop formation during the rotation which brings the first conduit opening and the docking port into sealed communication.

4. The filter assembly of claim 1, wherein the housing head and the end cap are arranged such that, during insertion of the end cap into the housing head, the end cap is required to be presented to the housing head at a tilt angle which is removed by a subsequent rotation which brings the first conduit opening and the docking port into sealed communication.

5. The filter assembly of claim 4, wherein one of the housing head and the end cap has a projecting portion which slidingly engages a surface of the other of the housing head and the end cap during insertion of the end cap into the housing head to enforce the tilt angle, the projecting portion being received in a recess formed in the other of the housing head and the end cap on the rotation which brings the first conduit opening and the docking port into sealed communication.

6. The filter assembly of claim 5, wherein the end cap has the projecting portion and the recess is the docking port.

7. The filter assembly of claim 1, wherein the housing head and the end cap have a guide arrangement which guides the end cap during the insertion thereof so as to bring the first conduit opening to a position facing the docking port in readiness for the rotation which brings the first conduit opening and the docking port into sealed communication.

8. The filter assembly of claim 1, wherein the housing head and the end cap have a camming arrangement operable to apply a force urging the rotation which brings the first conduit opening and the docking port into sealed communication.

9. The filter assembly of claim 8, wherein, on completion of the rotation, the camming arrangement is operable to apply a secondary force which over-pressures an interface between the first conduit opening and the docking port when they are in sealed communication, and then, with continued operation of the camming arrangement, to release the secondary force such that the over-pressure is relaxed but the first conduit opening and the docking port remain in sealed communication.

10. The filter assembly of claim 1, wherein the housing head is formed from an extruded body section having an extrusion direction which is parallel with an axis of the housing bowl, an opening being machined in the extruded body section to form the docking port.

11. A filter element for collecting material that is entrained in a fluid stream, the filter element comprising:
   a tubular filter through which, in use, the fluid stream flows, and an end cap providing a flow conduit which extends between a first conduit opening and a second conduit opening communicating with an internal void of the tubular filter, an axis of the first conduit opening being at an angle to an axis of the tubular filter;

the filter element being arranged for use with a housing for the filter element, the housing having inlet and outlet ports for the fluid stream, a housing bowl in which the tubular filter is located, and a housing head which provides at least one of the ports as a docking port for the first conduit opening, in use the end cap being inserted into the housing and then rotated relative to the housing head about an axis perpendicular to an axis of the tubular filter and to the axis of the first conduit opening to bring the first conduit opening and the docking port into sealed communication;

wherein the end cap has a projecting portion which slidingly engages a surface of the housing head during insertion of the end cap into the housing head to enforce a tilt angle at which the end cap is required to be presented to the housing head, the projecting portion being received in a recess formed in the housing head to remove the tilt angle on the rotation which brings the first conduit opening and the docking port into sealed communication; and wherein the first conduit opening is formed in a flange portion of the end cap, the flange portion having a docking surface which carries a ring seal surrounding the first conduit opening such that the ring seal locates at an interface between the first conduit opening and the docking port on the rotation which brings the first conduit opening and the docking port into sealed communication, the projecting portion projecting forwardly of the docking surface of the flange portion.

12. The filter element of claim 11, wherein the recess is the docking port.

13. The filter element of claim 11, wherein the end cap has a cam device which acts on a surface of the housing head and is operable to apply a force urging the rotation which brings the first conduit opening and the docking port into sealed communication.

14. The filter element of claim 13, wherein, on completion of the rotation, the cam device is operable to apply an extra force which over-pressures an interface between the first conduit opening and the docking port when they are in sealed communication, and then with continued operation of the cam device to release the extra force such that the over-pressure is relaxed but the first conduit opening and the docking port remain in sealed communication.

* * * * *